(12) United States Patent  (10) Patent No.: US 8,235,429 B2
Yang  (45) Date of Patent: Aug. 7, 2012

(54) FIXING BASE
(75) Inventor: Wei-Te Yang, Taipei (TW)
(73) Assignee: ASUSTeK Computer Inc., Taipei (TW)
( * ) Notice: Subject to any disclaimer, the term of this patent is extended or adjusted under 35 U.S.C. 154(b) by 894 days.
(21) Appl. No.: 12/190,594
(22) Filed: Aug. 13, 2008
(65) Prior Publication Data
US 2009/0072548 A1 Mar. 19, 2009
(30) Foreign Application Priority Data
Sep. 19, 2007 (TW) .............................. 96134873 A
(51) Int. Cl.
E05C 3/02 (2006.01)
E05C 3/00 (2006.01)
(52) U.S. Cl. ......... 292/240; 292/198; 292/200; 292/202
(58) Field of Classification Search .................. 292/198, 292/202, 200, 240, DIG. 11; 220/23.89
See application file for complete search history.
(56) References Cited

U.S. PATENT DOCUMENTS

| 272,671 | A | * | 2/1883 | England | 292/6 |
| 362,152 | A | * | 5/1887 | Ferren | 292/210 |
| 2,506,553 | A | * | 5/1950 | Slaughter, Jr. et al. | 292/240 |
| 2,607,102 | A | * | 8/1952 | Slaughter, Jr. | 27/17 |
| 2,666,248 | A | * | 1/1954 | Slaughter, Jr. | 27/17 |
| 4,462,317 | A | * | 7/1984 | Franko et al. | 109/45 |
| 5,225,293 | A | * | 7/1993 | Mitchell et al. | 429/97 |
| 5,630,632 | A | * | 5/1997 | Swan | 292/240 |
| 5,741,032 | A | * | 4/1998 | Chaput | 292/202 |
| 6,079,754 | A | | 6/2000 | Alexy | |
| 6,123,373 | A | * | 9/2000 | Yoshida | 292/241 |
| 6,299,224 | B1 | | 10/2001 | Finkelstein | |
| 6,547,289 | B1 | * | 4/2003 | Greenheck et al. | 292/126 |
| 7,029,040 | B2 | | 4/2006 | Lippoldt et al. | |
| 7,665,775 | B1 | * | 2/2010 | Miller et al. | 292/240 |

* cited by examiner

Primary Examiner — Carlos Lugo
(74) Attorney, Agent, or Firm — Jianq Chyun IP Office

(57) ABSTRACT

A fixing base is suitable to fix an electronic device having a locking hole. The fixing base includes a housing, a driving structure and a cam. The electronic device is suitable to be held in the housing. The driving structure is provided through the housing, and the cam is disposed in the housing. The cam has a hook, and the driving structure is fixedly connected to the cam. When the driving structure drives the cam to rotate, the hook is locked to the locking hole.

7 Claims, 5 Drawing Sheets

FIXING BASE

CROSS-REFERENCE TO RELATED APPLICATION

This application claims the priority benefit of Taiwan application serial no. 96134873, filed on Sep. 19, 2007. The entirety of the above-mentioned patent application is hereby incorporated by reference herein and made a part of this specification.

BACKGROUND OF THE INVENTION

1. Field of the Invention

The invention relates to a fixing base and, more particularly, to a fixing base for fixing an electronic device.

2. Description of the Related Art

Along with the progress of the science and technology, electronic devices are essential in daily life, and human-based and functional electronic products continuously weed through the old to bring forth the new. For example, an electronic device such as a personal digital assistant (PDA) on the market usually has a global positioning system (GPS) function, and a user can install a fixing base adjacent to the instrument panel of a vehicle and fix the electronic device having the GPS function to the fixing base. In this way, the user can know the direction of advance and the road condition via the electronic device having the GPS function when he drives.

The conventional fixing base on the market usually utilizes a holding structure with a large volume to fix the electronic device having the GPS function. When the user wants to take the electronic device out of the fixing base, he needs to apply great force to release the electronic device from the holding structure, which causes the user inconvenience.

BRIEF SUMMARY OF THE INVENTION

The invention provides a fixing base for fixing an electronic device, and then a user can easily fix the electronic device to the fixing base or take the electronic device out of the fixing base.

The invention provides a fixing base which is suitable to fix an electronic device whose bottom has a locking hole. The fixing base includes a housing, a driving structure and a cam. The electronic device is suitable to be held in the housing, and the driving structure is provided through the housing. The cam is disposed in the housing. The cam has a hook, and the driving structure is fixedly connected to the cam. When the driving structure drives the cam to rotate, the hook is locked to the locking hole.

In one embodiment of the invention, the driving structure includes a force applying portion, a rotation shaft and a connecting portion, and the rotation shaft is provided through the housing along an axis. The force applying portion is located at one end of the rotation shaft and outside the housing, and the connecting portion is located at the other end of the rotation shaft and is fixedly connected to the cam along the axis.

In one embodiment of the invention, the cam has a limiting hole, and the connecting portion is provided through the limiting hole along the axis.

In one embodiment of the invention, the fixing base further includes a fixing structure, and the fixing structure is connected to the connecting portion to fixedly connect the connecting portion on the cam.

In one embodiment of the invention, the connecting portion further includes at least a tenon locked to the fixing structure.

In one embodiment of the invention, the housing further includes a supporter, and the cam is disposed on the supporter.

In one embodiment of the invention, the housing further includes a shaft hole, and the driving structure is provided through the shaft hole.

In one embodiment of the invention, the cam further includes a flange.

In one embodiment of the invention, the distance between the flange and the axis is greater than the distance between the hook and the axis.

In the embodiment of the invention, a hook is disposed at the cam, and the driving structure can drive the cam to rotate. Therefore, when the electronic device is inserted to the housing, a user can make the cam rotate via the driving structure to make the hook on the cam locked to a locking hole of the electronic device, and then the electronic device can be steadily fixed to the fixing base. Furthermore, when the user wants to take out the electronic device fixed to the fixing base, he only needs to rotate the driving structure to release the hook from the locking hole. Further, he may push the electronic device inserted into the housing via the flange of the cam to allow the electronic device to loosely cooperate with the housing. Then, the user can easily take the electronic device out of the fixing base.

These and other features, aspects, and advantages of the present invention will become better understood with regard to the following description, appended claims, and accompanying drawings.

DETAILED DESCRIPTION OF THE EMBODIMENTS

Figure 1A:
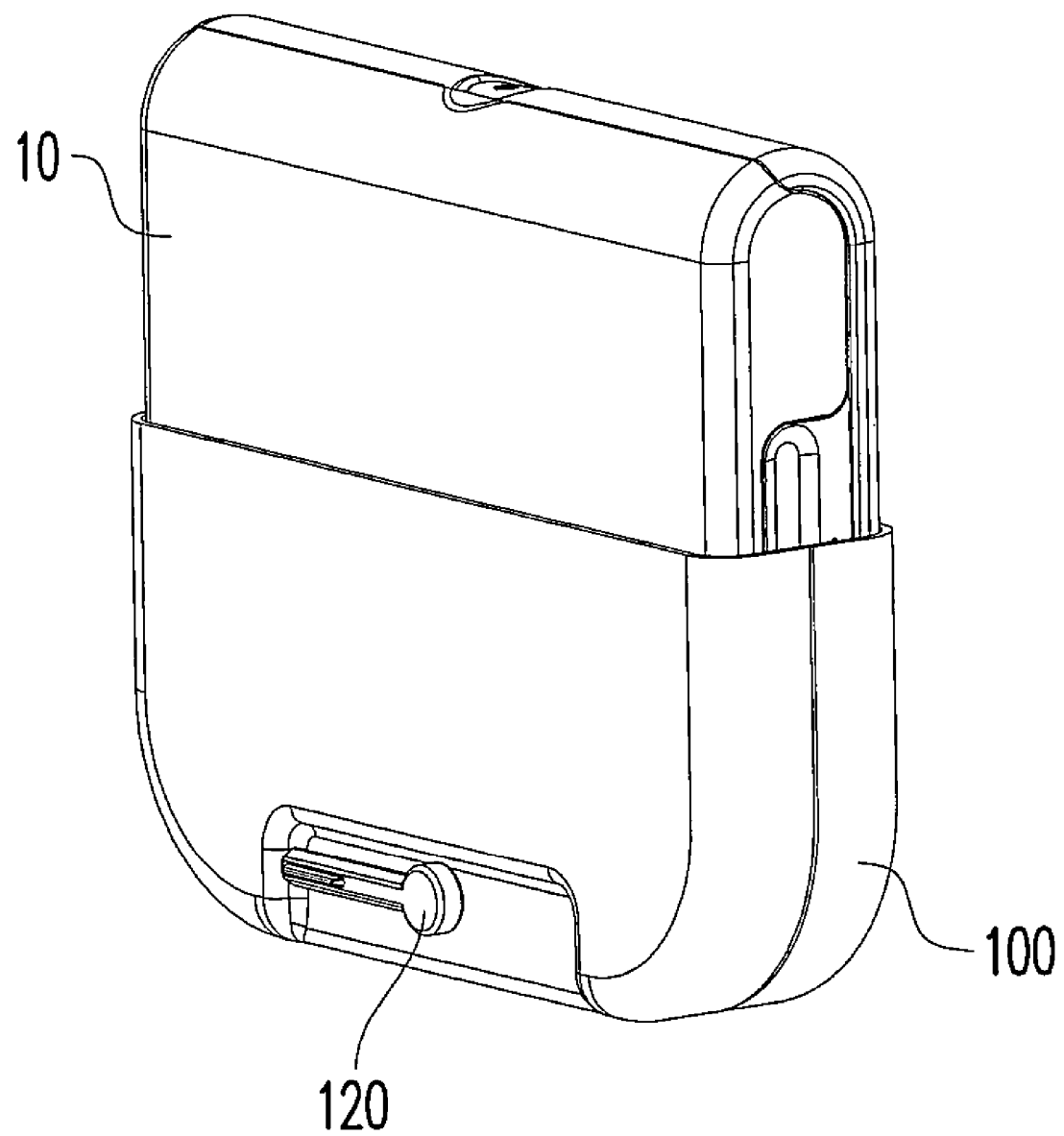
FIG. 1A is a schematic diagram showing an electronic device provided at a fixing base of an embodiment of the invention.
Figure 1B:
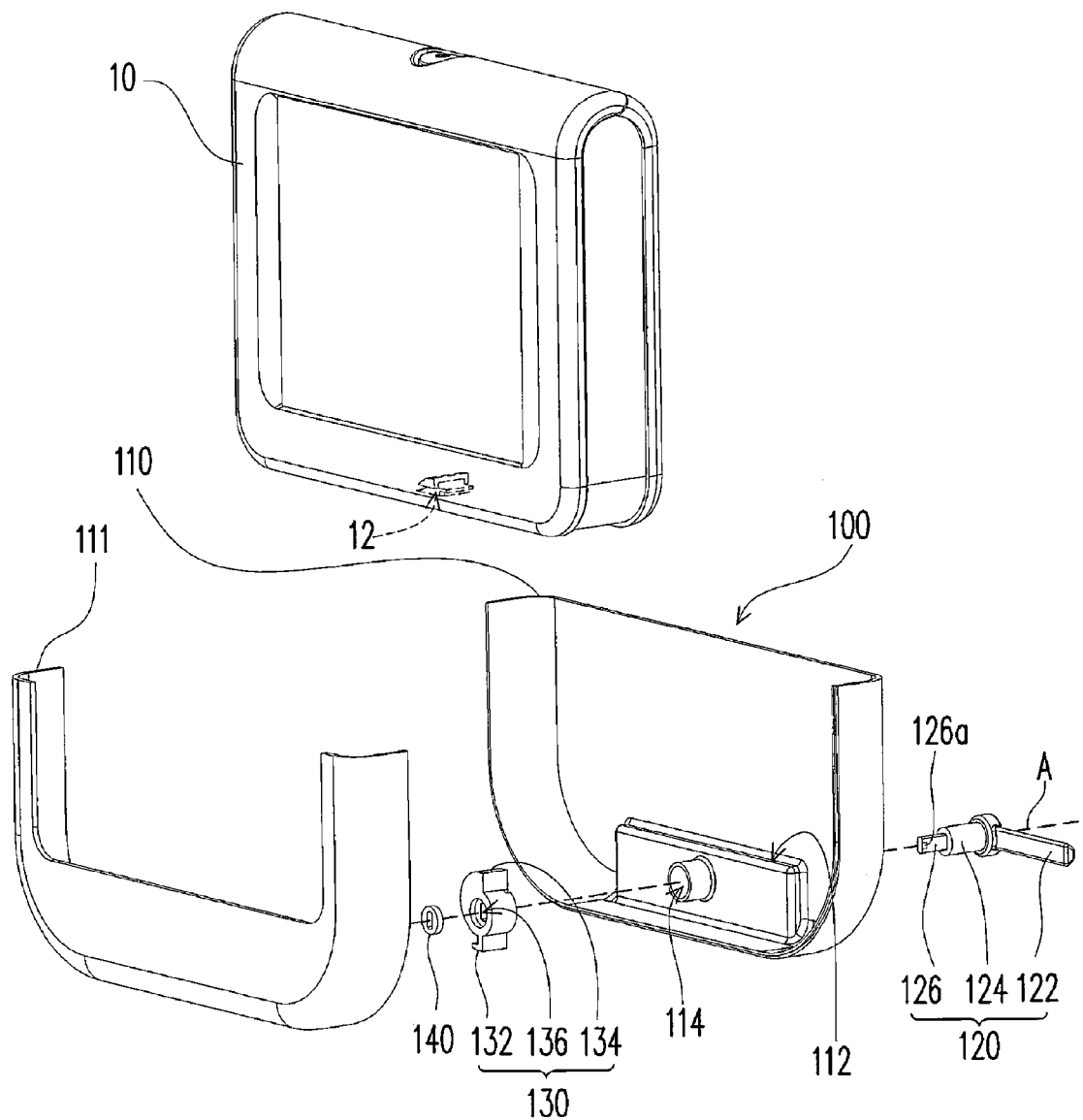
FIG. 1B is an exploded diagram showing a fixing base of an embodiment of the invention.

FIG. 1A is a schematic diagram showing an electronic device provided at a fixing base of an embodiment of the invention, and FIG. 1B is an exploded diagram showing the electronic device and the fixing base in FIG. 1A. As shown in FIG. 1A and FIG. 1B, an electronic device 10 having a global positioning system (GPS) function is suitable to be disposed on a fixing base 100 of the embodiment. The fixing base 100 of the embodiment may be, for example, installed adjacently to an instrument panel of a vehicle or other traffic tool, and then a user can know the road condition via the electronic device 10 having the GPS function when he drives (the fixing base 100 also may be used to fix a mobile phone or other electronic device, and it is not limited). The fixing base 100 of the embodiment can steadily fix the electronic device 10 thereon, and the user also can easily take the electronic device 10 out of the fixing base 100. The components of the fixing base 100 of the embodiment are illustrated in detail hereinbelow.

As shown in FIG. 1A and FIG. 1B, the fixing base 100 mostly includes a housing 110, a driving structure 120 provided through the housing 110 and a cam 130 having a hook 132, and the electronic device 10 is suitable to be inserted into the housing 110. Specifically, in the embodiment, for example, the housing 110 may be punchinged to form a supporter 112 at its interior wall. When the electronic device 10 is inserted to the housing 110, the electronic device 10 can lean on the supporter 112. The cam 130 is disposed on a shaft hole 114 of the housing 110, and the shaft hole 114 is formed on the supporter 112 in the embodiment. The fixing base 100 may further include a cover 111 for covering the supporter 112, the cam 130 and so on. The cover 111 and the housing 110 form a piece of holding space for holding the electronic device 10 to achieve the objectives of obtaining sense of beauty and protecting the electronic device 10.

In the embodiment, the fixing base 100 further includes the driving structure 120. The driving structure 120 is, for example, provided through the shaft hole 114 of the housing 110 along an axis A, and it can drive the cam 130 disposed in the housing 110. In the embodiment, the driving structure 120 consists of, for example, a force applying portion 122, a rotation shaft 124 and a connecting portion 126. The rotation shaft 124 is provided through the shaft hole 114 along the axis A, and the force applying portion 122 (a handle in the embodiment) is disposed at one end of the rotation shaft 124 and outside the housing 110 for the user to rotate. The connecting portion 126 is located at the other end of the rotation shaft 124 and is fixedly connected to the cam 130 along the axis A.

Figure 2:
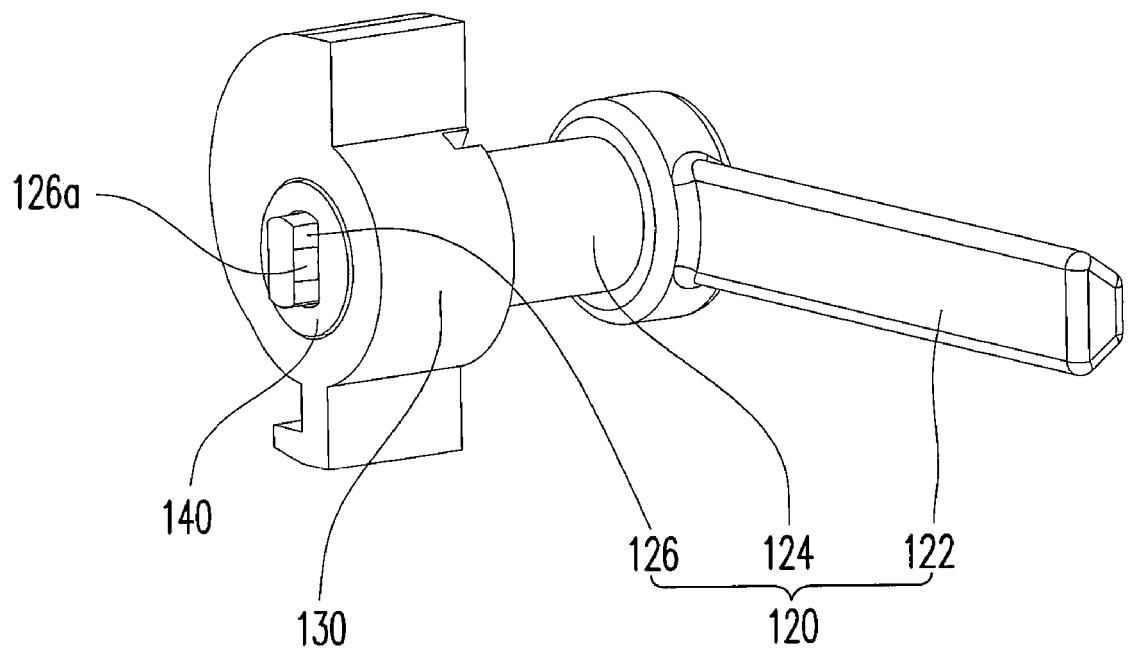
FIG. 2 is an assembly diagram showing the driving structure, the cam and the fixing structure of a fixing base of an embodiment of the invention.

Specifically, in the embodiment, the shaft center of the cam 130 has, for example, a limiting hole 136, and the connecting portion 126 can be provided through the limiting hole 136 along the axis A. Since the limiting hole 136 interferes with the connecting portion 126, the connecting portion 126 can drive the cam 130 to rotate when the force applying portion 122 rotates around the axis A. To allow the connecting portion 126 to be further steadily fixedly connected to the cam 130, the fixing base 100 of the embodiment may further include a fixing structure 140. After the connecting portion 126 is provided through the limiting hole 136 along the axis A, it can be further provided through the fixing structure 140, and at least a tenon 126a on the connecting portion 126 can be effectively locked to the fixing structure 140. FIG. 2 is an assembly diagram showing the driving structure, the cam and the fixing structure in FIG. 1. In this way, the connecting portion 126 can be steadily fixedly connected to the cam 130 via the fixing structure 140. In other preferred embodiment, other modes may be used to allow the connecting portion 126 and the cam 130 to have preferred connection relationship.

In the embodiment, detailed processes of fixing the electronic device 10 to the fixing base 100 and taking the electronic device 10 out of the fixing base 100 are illustrated hereinbelow.

Figure 3A:
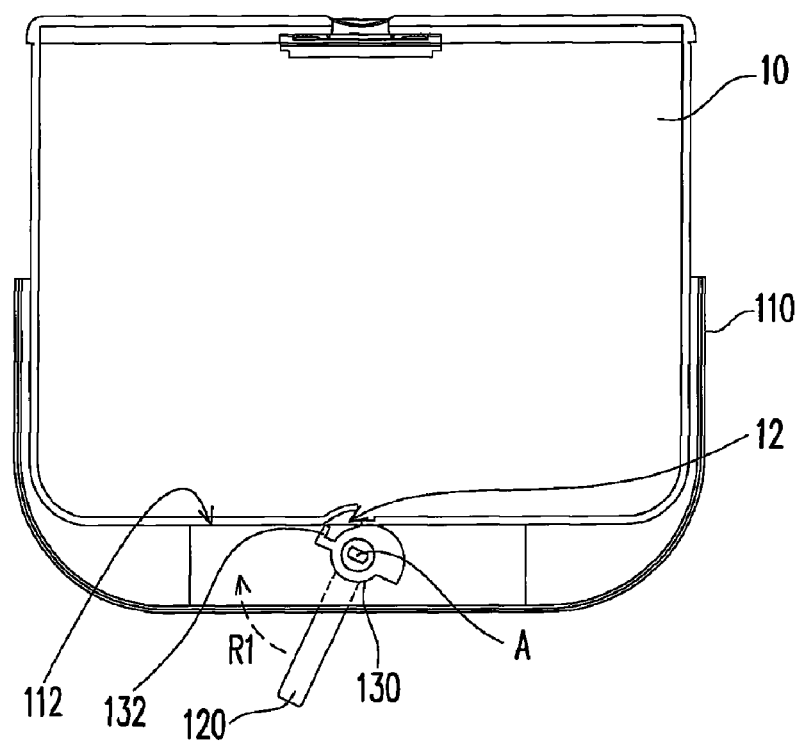
FIG. 3A to FIG. 3D are schematic diagrams showing processes of fixing an electronic device to a fixing base of an embodiment of the invention and taking the electronic device out of the fixing base.
Figure 3B:
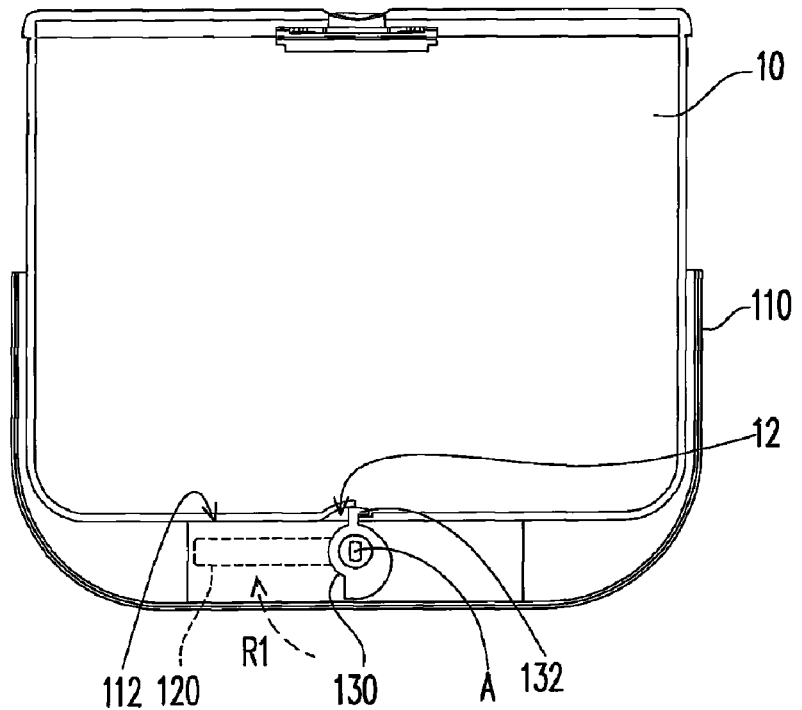

FIG. 3A to FIG. 3D are schematic diagrams showing processes of fixing the electronic device 10 in FIG. 1A to the fixing base and taking the electronic device 10 out of the fixing base. First, as shown in FIG. 3A and FIG. 3B, the cam 130 has the hook 132 in the embodiment. Therefore, when the electronic device 10 is inserted into the housing 110, and a user rotates the driving structure 120 toward a first rotation direction R1 around the axis A, the cam 130 is driven by the driving structure 120 to rotate. Then, the hook 132 rotates along with the cam 130, and it is locked to a locking hole 12 (as shown in FIG. 3B) at the bottom of the electronic device 10. In this way, the electronic device 10 is steadily fixed to the fixing base 100.

Figure 3C:
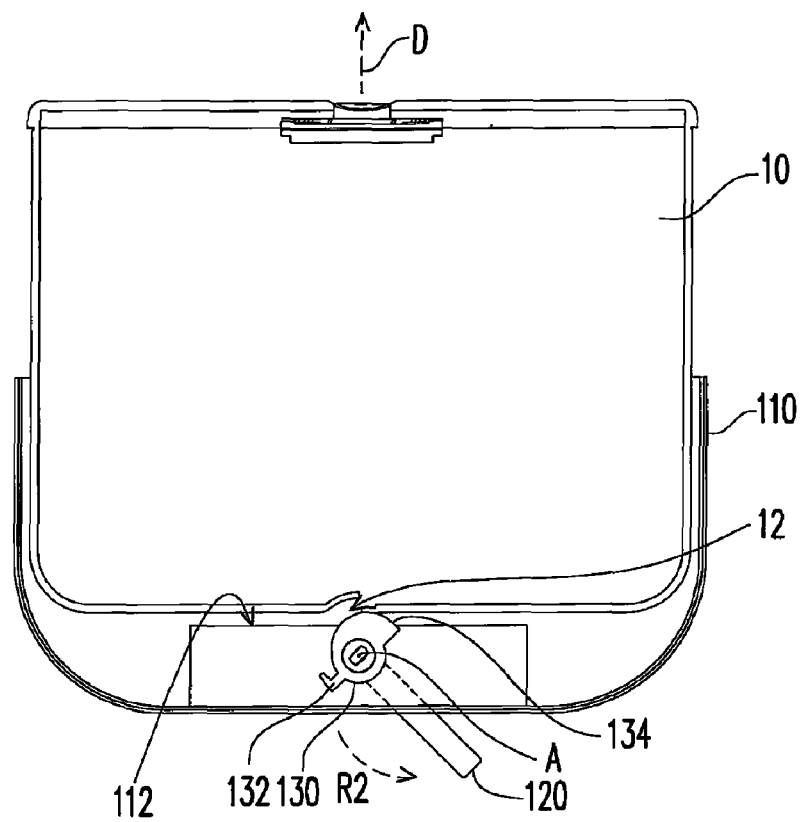
Figure 3D:
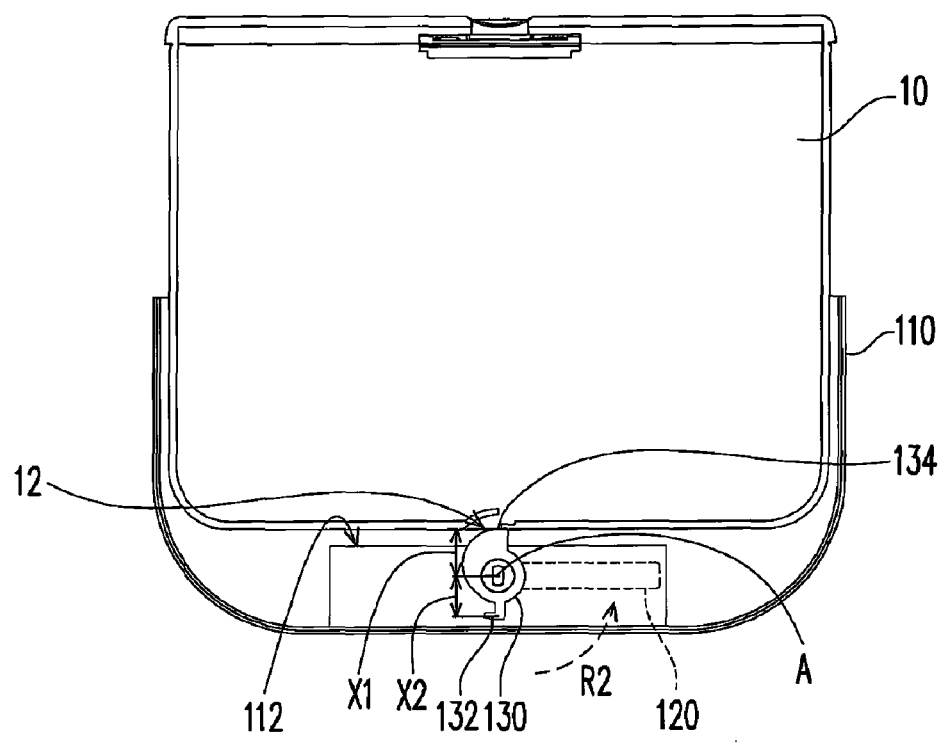

As shown in FIG. 3C and FIG. 3D, when the user wants to take the electronic device 10 out of the fixing base 100, he also can make the hook 132 released from the locking hole 12 by rotating the driving structure 120. In detail, the user can rotate the driving structure 120 toward a second rotation direction R2 (the second rotation direction R2 is opposite to the first rotation direction R1) around the axis A, and then the hook 132 can be released from the locking hole 12. A distance X1 between the flange 134 and the axis A is greater than a distance X2 between the hook 132 and the axis A. Therefore, after the user makes the hook 132 released from the locking hole 12 and makes the cam 130 rotate one hundred and fifty degrees to one hundred and eighty degrees toward the second rotation direction R2, the flange 134 of the cam 130 pushes the electronic device 10 inserted into the housing 110 along a push direction D. Then, the electronic device 10 no longer leans against the supporter 112, and the electronic device 10 and the housing 110 loosely cooperate with each other. In this way, the user can easily take the electronic device 10 out of the fixing base 100.

To sum up, the invention utilizes the driving structure to drive the cam disposed in the housing of the fixing base, and the cam has the hook. Therefore, when the electronic device is inserted into the housing, the user can make the cam rotate via the driving structure to allow the hook of the cam to be locked to the locking hole at the bottom of the electronic device, and then the electronic device is steadily fixed to the fixing base. When the user wants to take out the electronic device fixed to the fixing base, he only needs to rotate the driving structure in a contrary direction, and then the hook is released from the locking hole. The user also can upward push the electronic device which is still inserted into the housing via the flange of the cam to allow the electronic device to loosely cooperate with the housing. Then, the user can easily take the electronic device out of the fixing base.

Since the driving structure and the cam having the hook have small volume, the fixing base of the invention has a small size to be light and slim.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A fixing base for fixing an electronic device whose bottom has a locking hole, the fixing base comprising:
   a housing which is adapted to hold the electronic device;
   a driving structure passing through the housing; and
   a cam having a hook and the cam disposed in the housing;
   wherein the driving structure is fixedly connected to the cam to drive the cam to rotate relatively to the housing around an axis between a locked position and an unlocked position, wherein the locked position is when the hook locked to the locking hole;
   the cam further comprises a flange opposite to the hook for pushing the electronic device to move away from the housing when the cam is further rotated after the hook is in unlocked position, and a distance between the flange and the axis is greater than a distance between the hook and the axis.

2. The fixing base according to claim 1, wherein the driving structure comprises a force applying portion, a rotation shaft and a connecting portion, the rotation shaft passes through the housing along the axis, the force applying portion is located at one end of the rotation shaft and outside the housing, and the connecting portion is located at the other end of the rotation shaft and is fixedly connected to the cam along the axis.

3. The fixing base according to claim 2, wherein the cam has a limiting hole.

4. The fixing base according to claim 2 further comprising a fixing structure for fixing the connecting portion on the cam.

5. The fixing base according to claim 4, wherein the connecting portion further comprises a tenon locked to the fixing structure.

6. The fixing base according to claim 1, wherein the housing further comprises a supporter, and the cam is disposed on the supporter.

7. The fixing base according to claim 1, wherein the housing further comprises a shaft hole, and the driving structure passes through the shaft hole.

* * * * *